US012687408B2

(12) United States Patent
Remillard et al.

(10) Patent No.: US 12,687,408 B2
(45) Date of Patent: Jul. 21, 2026

(54) POSITION ENCODER BASED ON HALBACH MAGNETIC ELEMENT

(71) Applicant: Novanta Corporation, Bedford, MA (US)

(72) Inventors: Paul A. Remillard, Littleton, MA (US); Deepak Surendran, Wilmington, MA (US)

(73) Assignee: NOVANTA CORPORATION, Bedford, MA (US)

( * ) Notice: Subject to any disclaimer, the term of this patent is extended or adjusted under 35 U.S.C. 154(b) by 181 days.

(21) Appl. No.: 18/798,225

(22) Filed: Aug. 8, 2024

(65) Prior Publication Data

US 2024/0393140 A1 Nov. 28, 2024

Related U.S. Application Data

(63) Continuation of application No. 17/944,380, filed on Sep. 14, 2022, now Pat. No. 12,123,751.

(Continued)

(51) Int. Cl.
*G01D 5/14* (2006.01)
*G01B 7/00* (2006.01)

(52) U.S. Cl.
CPC ............. *G01D 5/145* (2013.01); *G01B 7/003* (2013.01)

(58) Field of Classification Search
CPC .. G01D 5/00; G01D 5/12; G01D 5/14; G01D 5/142; G01D 5/145; G01B 7/00;
(Continued)

(56) References Cited

U.S. PATENT DOCUMENTS

| | | | |
|---|---|---|---|
| 7,830,138 | B2 | 11/2010 | Wolf et al. |
| 9,354,084 | B2 | 5/2016 | Ausserlechner et al. |

(Continued)

FOREIGN PATENT DOCUMENTS

| | | |
|---|---|---|
| CN | 102868279 | 1/2013 |
| CN | 103891114 | 6/2014 |

(Continued)

OTHER PUBLICATIONS

Han Q., et al.: "Four-And Eight-Piece Halbach Array Analysis and Geometry Optimisation for Maglev," IEE Proceedings: Electric Power Applications, Institution of Electrical Engineers, GB, vol. 152, No. 3, Apr. 8, 2005, pp. 535-542.

*Primary Examiner* — Hoai-An D. Nguyen
(74) *Attorney, Agent, or Firm* — BainwoodHuang

(57) ABSTRACT

A Halbach-based magnetic position sensor includes a Halbach magnetic element having a spatially rotating magnetization pattern along an extent, producing a focused and augmented magnetic field on a working side relative to a magnetic field on a non-working side. A sensing element on the working side is co-configured with the Halbach magnetic element for relative motion therebetween. The sensing element includes encoder circuitry and magnetic sensors that sense the working-side magnetic field and produce corresponding sensor signals. The encoder circuitry translates the sensor signals into position signals indicating relative position between the sensing element and the Halbach magnetic element. In one example the Halbach magnetic element has a closed curve (e.g., substantially circular or ring-like) configuration.

7 Claims, 13 Drawing Sheets

42

Magnetic Field Region

Related U.S. Application Data

(60) Provisional application No. 63/243,829, filed on Sep. 14, 2021.

(58) Field of Classification Search
CPC ... G01B 7/003; H01F 7/00; H01F 7/02; H01F 7/0273; H01F 7/0278
USPC ................................ 324/200, 207.11, 207.25
See application file for complete search history.

(56) References Cited

U.S. PATENT DOCUMENTS

| | | | |
|---|---|---|---|
| 9,605,978 B2 | 3/2017 | Ausserlechner et al. | |
| 9,915,552 B2 | 3/2018 | Ausserlechner | |
| 10,170,972 B2 | 1/2019 | Wu | |
| 10,458,819 B2 | 10/2019 | Aichriedler et al. | |
| 10,502,588 B2 | 12/2019 | Ausserlechner | |
| 10,677,617 B2 | 6/2020 | Ausserlechner et al. | |
| 10,690,523 B2 | 6/2020 | Aichriedler et al. | |
| 10,704,933 B2 | 7/2020 | Aichriedler et al. | |
| 11,549,830 B2 | 1/2023 | Ausserlechner et al. | |
| 12,301,066 B2 * | 5/2025 | Tucker | G01D 18/001 |
| 12,345,783 B2 * | 7/2025 | Cai | G01R 33/098 |
| 2012/0105057 A1 | 5/2012 | Mol | |
| 2016/0061637 A1 | 3/2016 | Aichriedler et al. | |
| 2016/0245674 A1 | 8/2016 | Ausserlechner | |
| 2017/0052038 A1 | 2/2017 | Aichriedler et al. | |
| 2017/0284836 A1 | 10/2017 | Aichriedler et al. | |
| 2018/0087926 A1 | 3/2018 | Ausserlechner | |
| 2018/0342933 A1 | 11/2018 | Tangudu et al. | |
| 2019/0212173 A1 | 7/2019 | Aichriedler et al. | |
| 2020/0284623 A1 | 9/2020 | Ausserlechner et al. | |
| 2025/0141315 A1 * | 5/2025 | Biro | H02K 7/02 |
| 2025/0244151 A1 * | 7/2025 | Forthuber | G01D 5/2458 |

FOREIGN PATENT DOCUMENTS

| | | |
|---|---|---|
| CN | 105034848 | 11/2015 |
| CN | 110244243 | 9/2019 |
| EP | 3929537 | 7/2023 |
| JP | 2007093569 | 4/2007 |
| WO | 2006076968 | 7/2006 |

* cited by examiner

Ferrous Material

20

Ferrous Material

20

Example: An Octupole Superimposed on a Dipole Circular Halbach Array

Alternating Polarity

Halbach Array

POSITION ENCODER BASED ON HALBACH MAGNETIC ELEMENT

CROSS REFERENCE TO RELATED APPLICATIONS

This application is a continuation of U.S. application Ser. No. 17/944,380 filed Sep. 14, 2022 for Position Encoder Based on Halbach Magnetic Element, the disclosure of which is hereby incorporated by reference in its entirety.

BACKGROUND

The invention relates to the field of magnetic position encoders.

SUMMARY

A magnetic on- or off-axis, rotary and linear, absolute position encoder based on Halbach permanent magnet configurations is described. Also described are means for increasing resolution by superimposing small spatial period dipole onto a large spatial period dipole which increases resolution and keeps absolute-position-encoder functionality. Rotary and linear magnetic position may be encoded with an off the shelf magnetic sensor. The encoder can be easily installed and aligned, is compact in size, low power and low-cost with an absolute position output suitable for on and off axis encoder applications as well as linear magnetic grating applications.

Rotary and linear magnetic encoders which are based on alternating pole direction dipole field patterns are in general use now such as motors and particle beam physics. They can achieve high resolution by working off-axis. This high resolution is achieved by increasing pattern diameter or decreasing dipole feature size. These approaches to higher resolution adversely affect the associated encoder design and application by increasing the "grating" diameter and/or reducing alignment tolerance. These undesirable sensitivities are due to alternating dipole based magnetic encoders essentially being linear encoders wrapped into a ring shape. So, they are sensitive to translations when the only motion intended for detection is rotation.

Described herein is an encoder employing a dipole magnet of Halbach design. This magnet design has an advantage over other dipole designs because it provides a very uniform dipole field over the area of the sensor for high dipole field fidelity. It has virtually zero magnetic field outside of the Halbach element for low crosstalk with other nearby magnetic encoders, and when the Halbach element is surrounded by a ferrous holder, it makes the element much less susceptibility to external field interference. This disclosed encoder provides true on or off axis design, better dipole fidelity, self-shielding, low power, better alignment tolerance and smaller size than other alternating dipole magnetic encoders.

To achieve even higher resolution, it is possible to design a Halbach element with a superimposed multi-pole design (a quadrupole doubles the resolution, a sextupole triples the resolution, etc.). As an example, a quadrupole produces a two-period sinusoid per revolution riding on a common mode single period sinusoid when sensed by a magnetic field amplitude sensor. Thus, the encoder is still absolute yet, with the quadrupole component, the resolution doubles. Both these "Tracks" are inherently locked together for an absolute encoder with higher resolution.

The encoder provides for high resolution rotary encoding in a small form factor and allows for wide alignment tolerances. It is suitable for applications such as surgical robots and other robotic applications where small size, wide alignment tolerances, and insensitivity to magnetic fields are required. Additionally, the encoder is well suited for applications such as surgical robot applications in which multiple axes of motion are clustered in compact groups, which increases the likelihood of position sensor crosstalk when using typical magnetic encoders. It is also particularly suited for use as position feedback integrated into miniature motors with extremely small power consumption.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

A Halbach-based magnetic position sensor includes a Halbach magnetic element having a spatially rotating magnetization pattern along an extent, producing a focused and augmented magnetic field on a working side relative to a magnetic field on a non-working side. A sensing element on the working side is co-configured with the Halbach magnetic element for relative motion therebetween. The sensing element includes encoder circuitry and magnetic sensors that sense the working-side magnetic field and produce corresponding sensor signals. The encoder circuitry translates the sensor signals into position signals indicating relative position between the sensing element and the Halbach magnetic element.

In one example the Halbach magnetic element has a closed curve (e.g., substantially circular or ring-like, see FIG. 1) configuration, with the sensing element located in an inner area ("bore") for an an-axis configuration. In another example the Halbach magnetic element has a linear shape and extent (see FIGS. 21-23).

Figure 1:
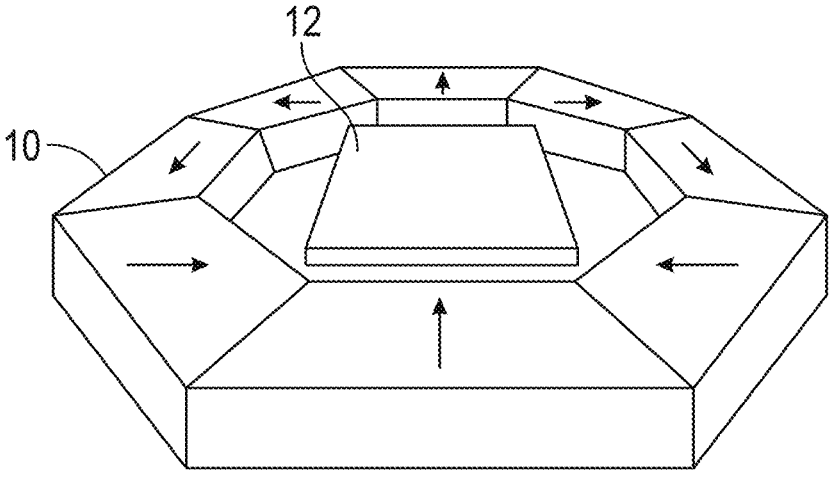
FIG. 1 is a schematic depiction of a Halbach magnetic position sensor.

FIG. 1 is a schematic depiction of an example Halbach-based magnetic position encoder, in this case is a rotary encoder. It includes a magnetic element 10, configured as a Halbach array, and a magnetic sensor 12, which are configured for relative rotation (i.e., array 10 rotates about stationary sensor 12, or vice-versa). The Halbach array 10 is a magnetic array that utilizes permanent magnets (8 in this example) arranged with a spatially rotating magnetic field vector orientation. It has the effect of focusing and augmenting the magnetic field on one side ("working side"), while cancelling it out on the other side ("non-working side"), which can result in highly uniform and parallel field lines inside the Halbach array 10. A Halbach-based encoder can be used for absolute angle measurements, with one benefit being that it is highly insensitive to misalignment (i.e., it produces an accurate position indication even when there is imperfect alignment of the array 10 and sensor 12).

Figure 2:
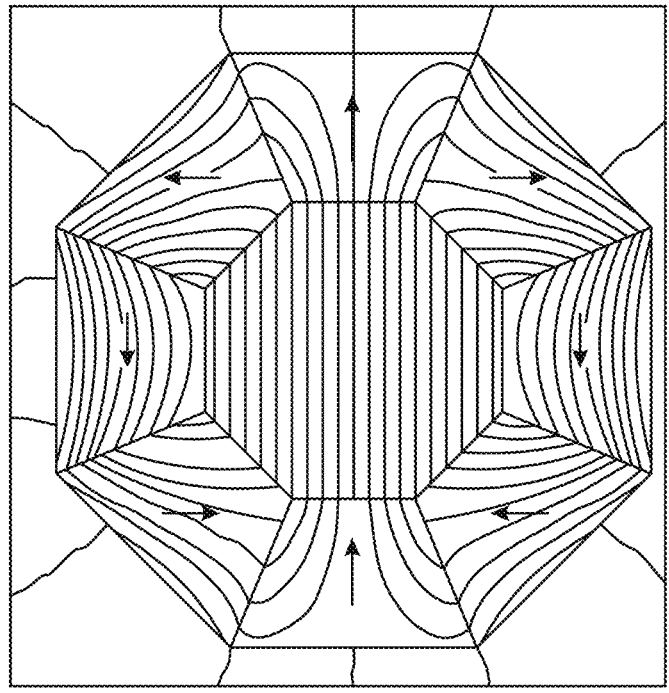
FIG. 2 is a field plot for a Halbach magnetic element.

FIG. 2 is a plot of magnetic field for the example Halbach array 10 of FIG. 1. For a theoretical Halbach element having continuously varying dipole orientation around its circular extent, there is virtually no magnetic field outside of the magnet and the field is completely contained within the bore of the magnet. FIGS. 1-2 depict an example in which the Halbach array 10 is formed from a plurality (8) of discrete linear segments. This results in the field not being completely cancelled on the outside of the segmented Halbach magnet. Alternatively as described below, a Halbach element may be formed in a more continuously magnetized manner, which may further improve the working-side field and the field cancellation on the non-working side.

Figure 4:
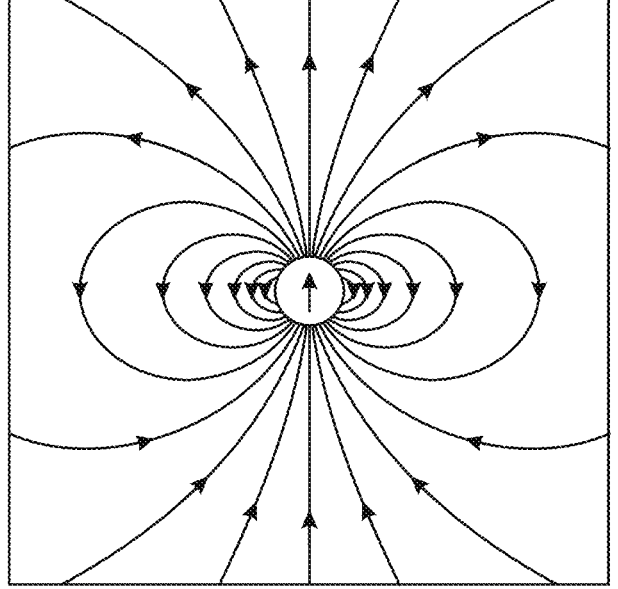
FIGS. 3 and 4 are schematic depictions of field lines for a Halbach element and simple dipole respectively.
Figure 3:
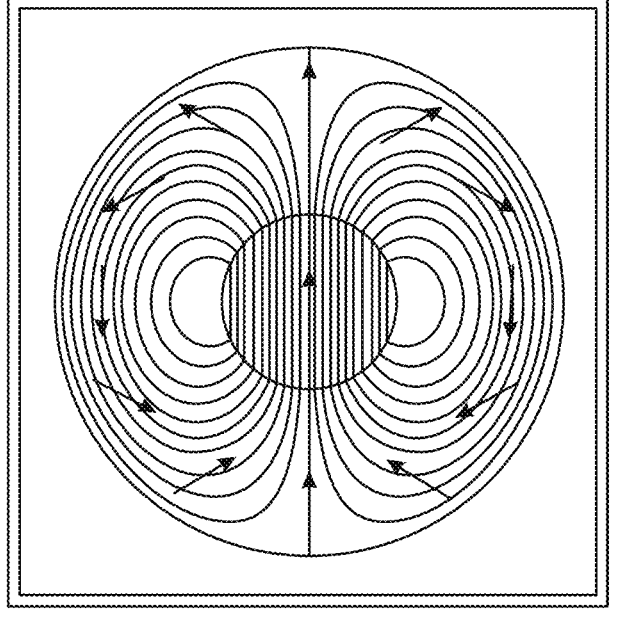
Figure 6:
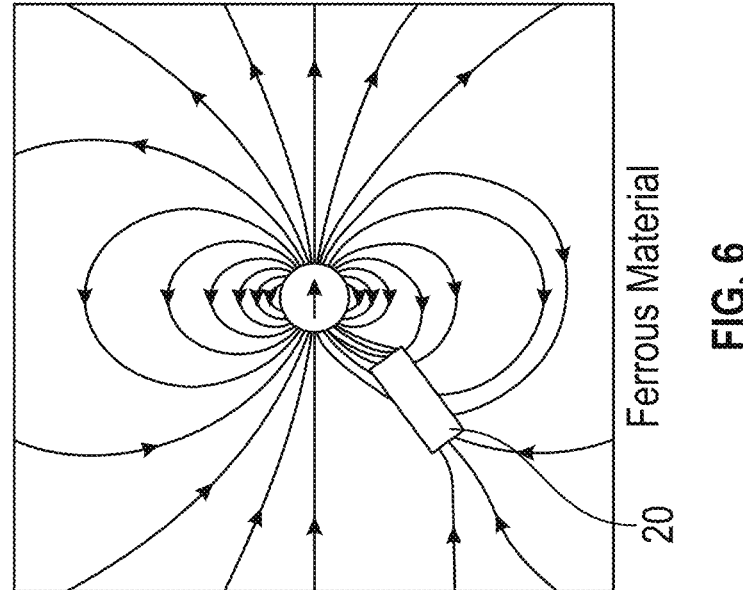
FIGS. 5 and 6 are schematic depictions of field lines for a Halbach sensor and simple dipole respectively in the presence of nearby ferrous material.
Figure 5:
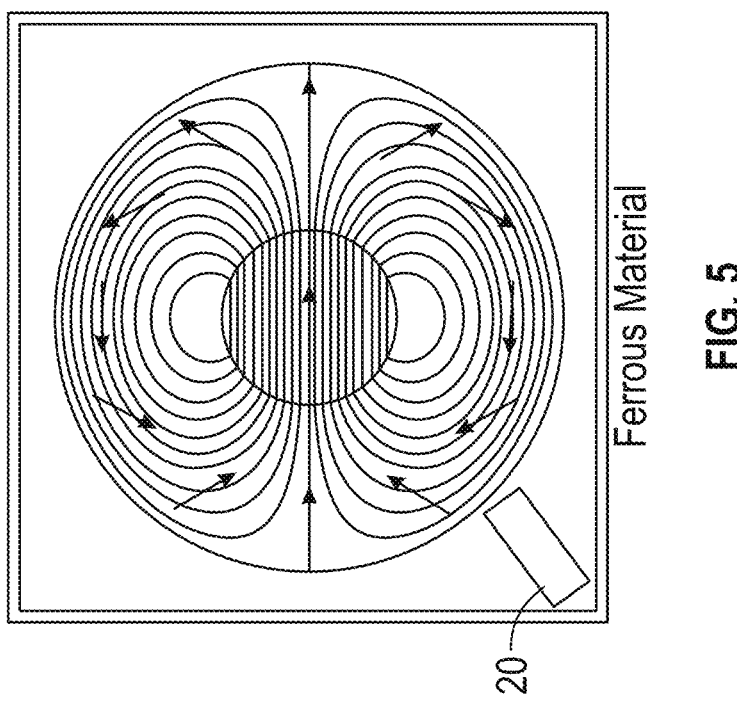
Figure 7:
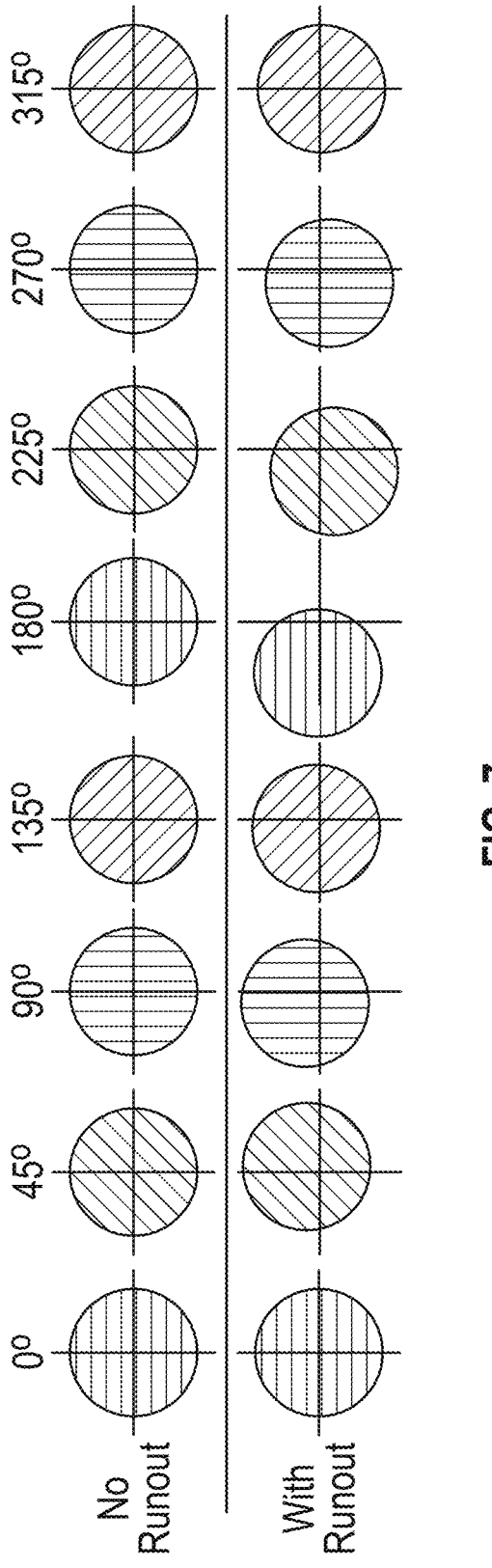
FIG. 7 is a schematic depiction of an effect of runout for a Halbach magnetic position encoder.

There are several advantages to the above aspect of a Halbach-based encoder:

a) Having low or no magnetic field produced outside the Halbach element allows other magnetic encoders to be located close by without substantial cross talk. This feature is illustrated by FIGS. 3 and 4. FIG. 3 shows the compact field pattern of a Halbach element, in this case having a continuously magnetized configuration, while FIG. 4 shows the much more expansive field pattern of a simple dipole magnet.

b) Ferrous materials interact with magnetic fields to cause aberrations at the sensor. Since there is no magnetic field outside the Halbach element, nearby ferrous materials have no effect on the magnetic sensor inside the Halbach element. This is illustrated in FIGS. 5 and 6. FIG. 5 shows the minimal effect of nearby ferrous material 20 on the compact field pattern of a Halbach element, while FIG. 6 shows the much greater effect on the field pattern of a simple dipole magnet.

c) The circular Halbach element produces a very uniform field in its bore. Hence, the sensor does not need to be perfectly centered in the magnet in X, Y or Z dimensions. Thus, it allows for wide alignment range without compromising the accuracy.

d) The presence of a large uniform magnetic field area in the Halbach magnet allows for robust position encoder accuracy, even under conditions of misalignment due to installation or system alignment challenges, such as dynamic runout. This is illustrated in FIG. 7. In these images the sensor is centered at an origin of an X-Y grid, and the field lines from the magnetic array are depicted in circles on this same grid. The top row shows ideal alignment, while the bottom row illustrates a type of misalignment known as "run-out". Despite the misalignment due to run-out as shown in the bottom row, the angles of the field lines at the origin (sensor position) remain identical to the angles of the field lines in the ideal-alignment case of the top row throughout the full 360 degrees of rotation.

e) The use of a Halbach element can also allow a designer more flexibility to meet size constraints of a particular application by trading off length and width of the magnet structure to achieve the proper magnetic field and sensor constraints.

Figure 8:
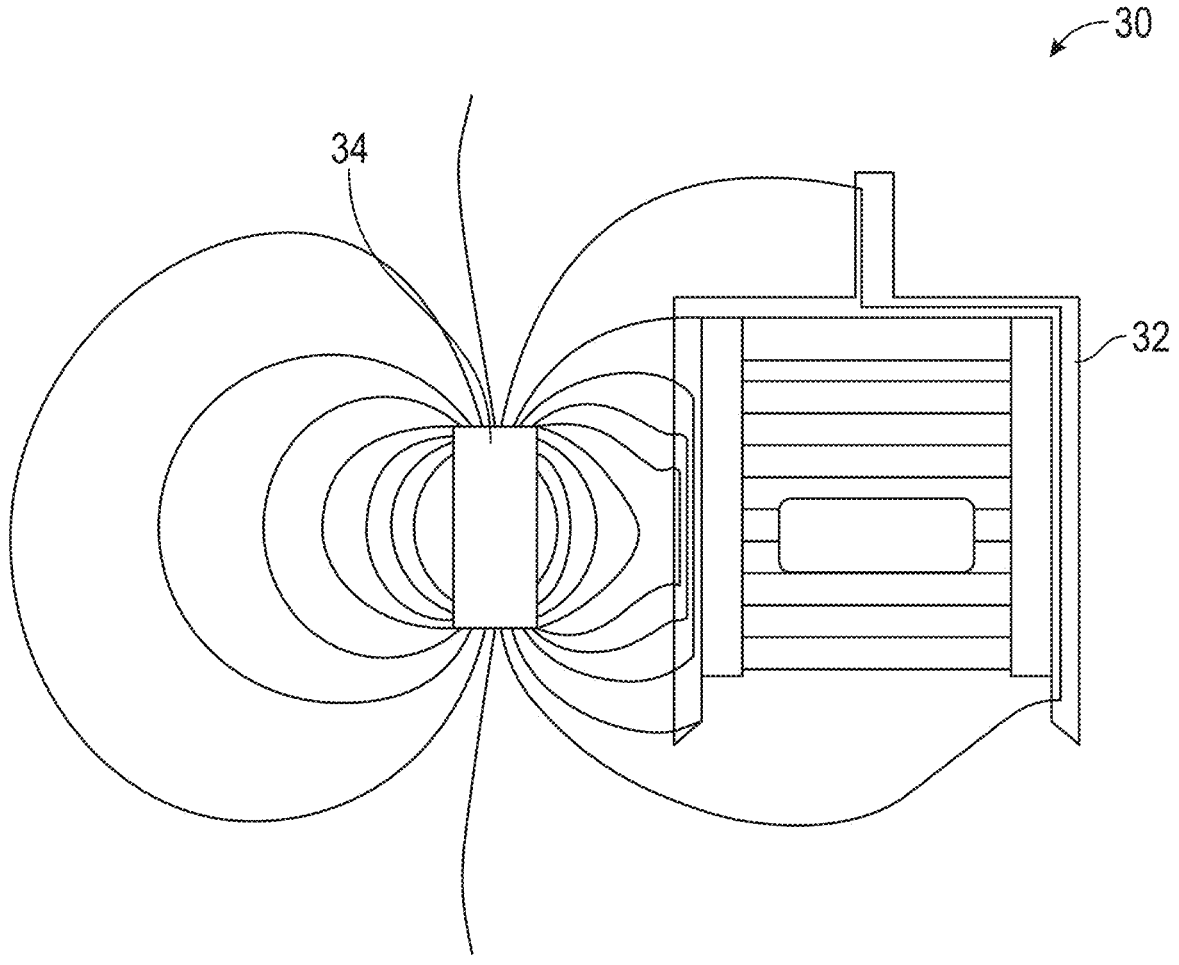
FIG. 8 is a schematic depiction of a shielded Halbach encoder in the presence of a nearby magnetic dipole.

FIG. 8 depicts a Halbach-based encoder 30 employing a ferrous enclosure 32 for shielding. This arrangement can exhibit the following characteristics and advantages:

a) The enclosure 32 around a circular Halbach element provides mechanical stability to the structure.

b) Using a ferrous material for the enclosure also has the added benefit of shielding the sensor from external magnetic fields. FIG. 8 depicts such external fields as generated by a separate magnetic element 34 in the vicinity. Since the Halbach magnet has little or no magnetic field on the outside (non-working side) of the permanent magnet cylinder, the enclosure 32 needs to carry only enough flux to accommodate the interfering field to act as a shield. The shield 32 therefore can be very small while remaining highly effective against the same interfering magnetic fields.

c) The ferrous enclosure 32 preferably rotates with the Halbach element making the encoder immune to hysteresis effects of the shield enclosure 32. Other ferrous objects will not cause hysteresis because of a lack of field outside of the Halbach element.

FIGS. 9-12 illustrate use of a circular Halbach element in ways that increase on-axis encoder resolution. Increasing the number of poles in the circular Halbach element results in increased resolution because more periods are traversed per physical rotation.

Figure 9:
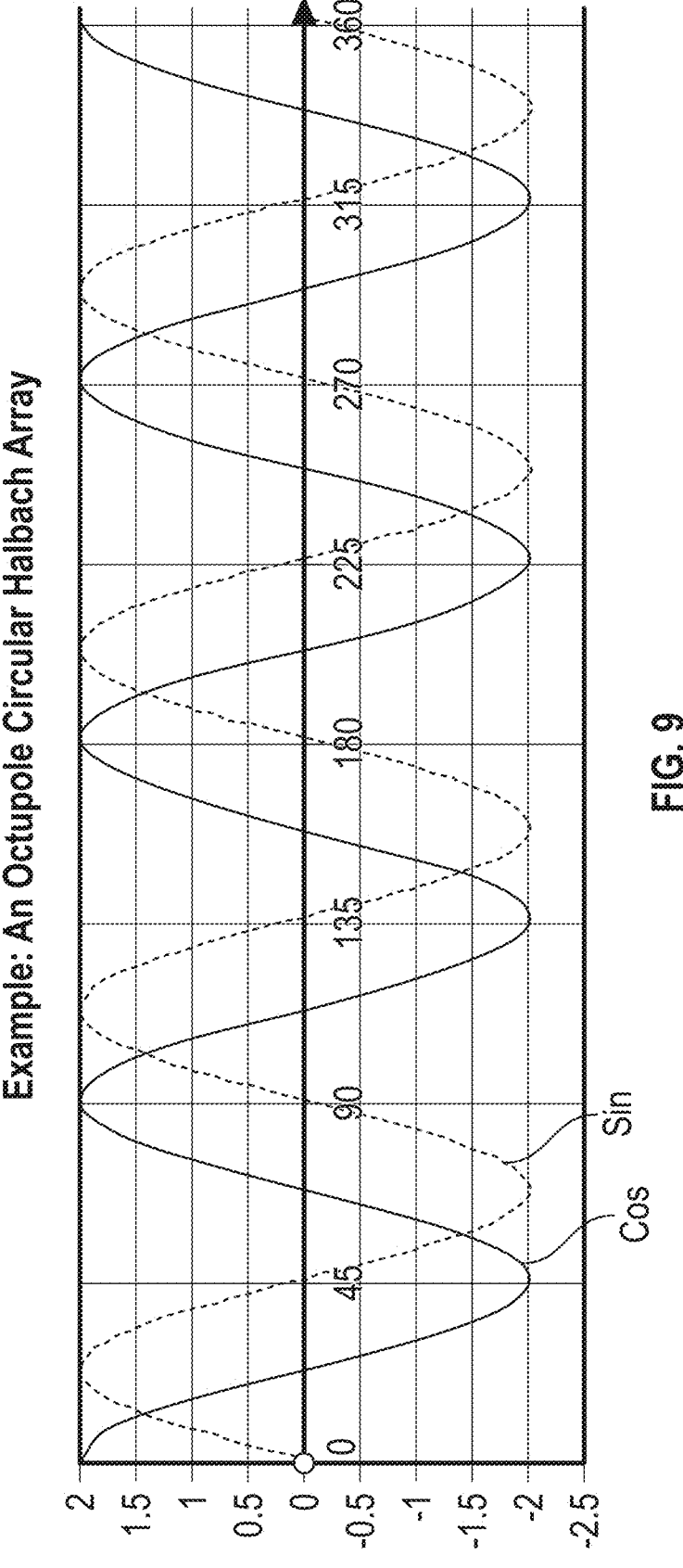
FIG. 9 is a plot of position signals for an octupole circular Halbach encoder.

FIG. 9 shows an example 8-pole ("octupole") circular Halbach element, which quadruples resolution by providing four periods per revolution.

Figures 10, 11:
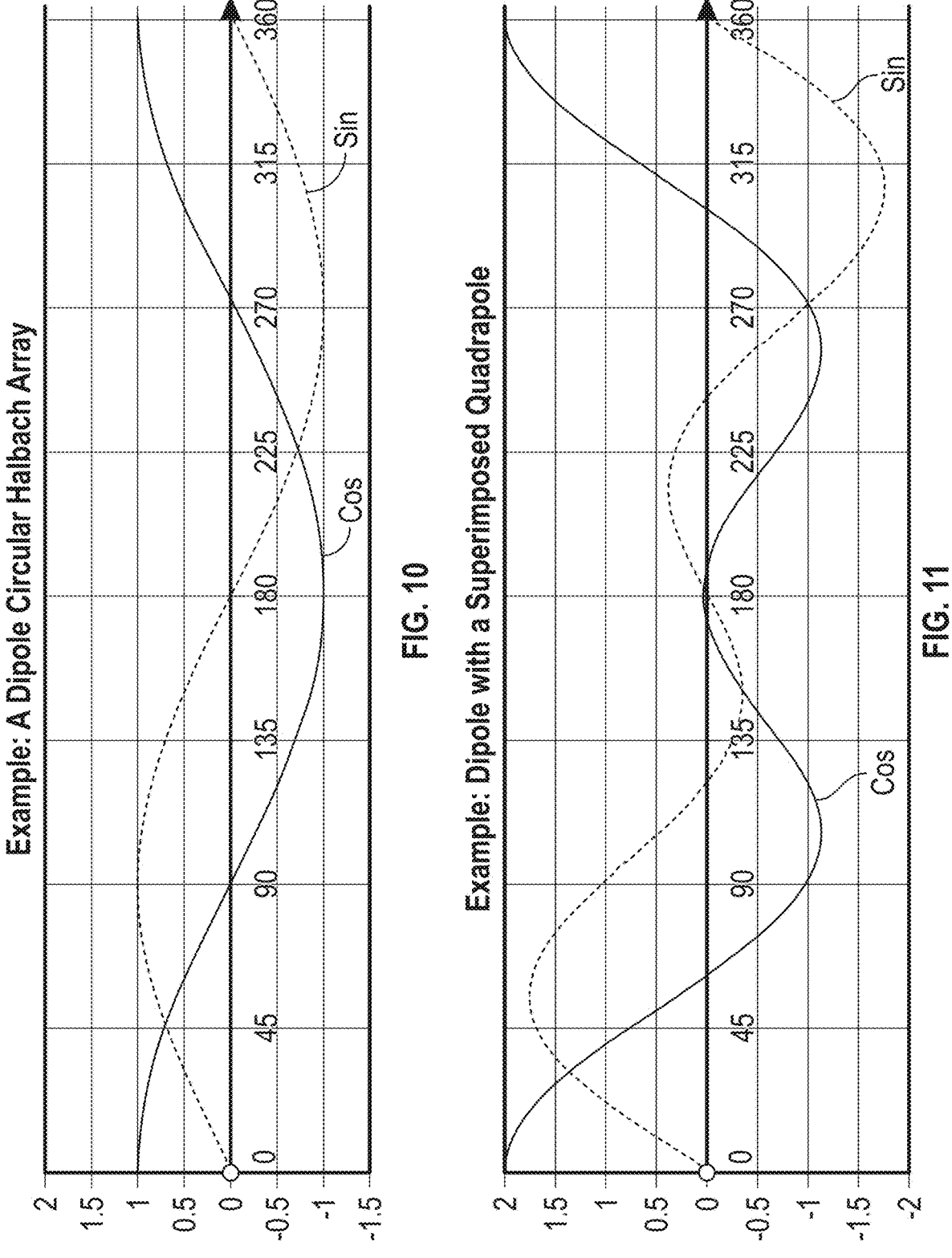
FIG. 10 is a plot of position signals for a dipole circular Halbach encoder.
FIG. 11 is a plot of position signals for a circular Halbach encoder having a dipole superimposed with a quadrupole.
Figure 12:
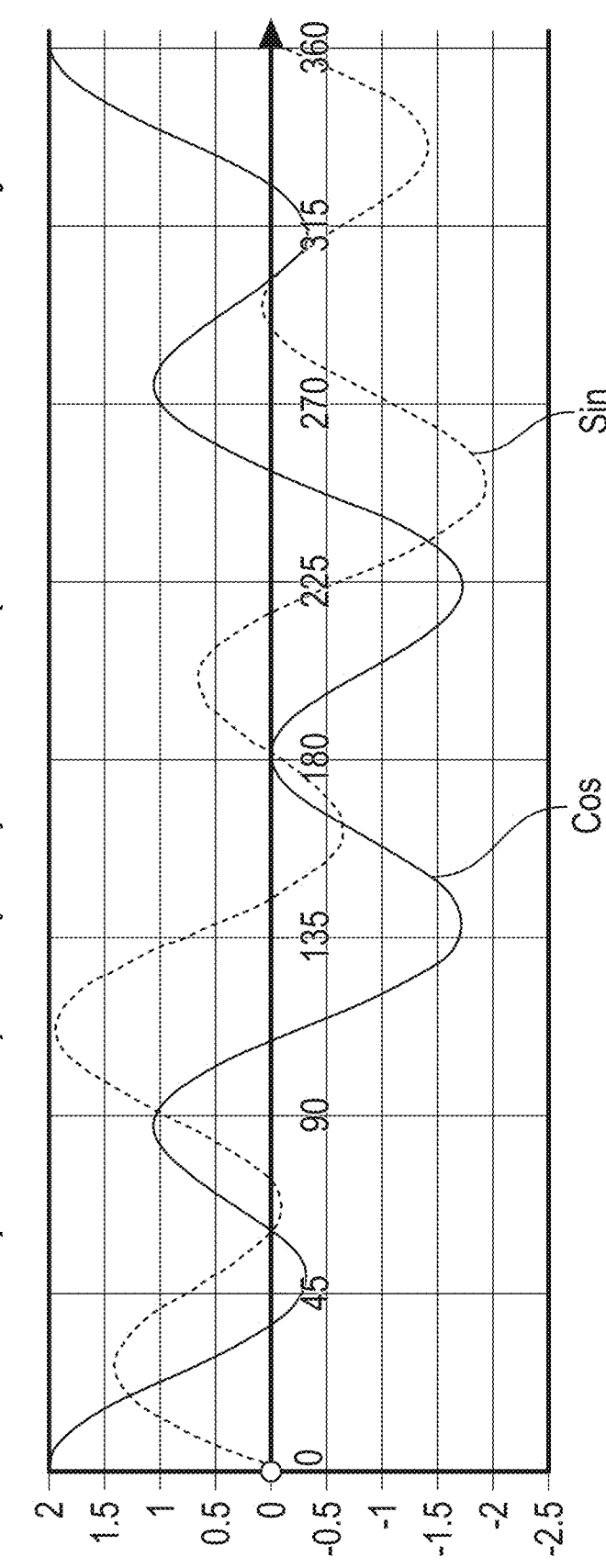
FIG. 12 is a plot of position signals for a circular Halbach encoder having a dipole superimposed with an octupole.

FIGS. 10-12 illustrate superposition of a once per period dipole on a multiple-period per revolution multipole, which can allow for greater resolution without losing absolute position. FIG. 10 shows the dipole pattern in isolation, which can be generated by example from two sensors orientated 180 degrees from each other. FIG. 11 shows the superposition of the dipole characteristic with a separate quadrupole pattern, and FIG. 12 shows the superposition of the dipole characteristic with a separate octupole pattern.

In all the above, one sensor can be used with appropriate choice of Halbach design coefficients to phase demodulate the dipole and multipole tracks.

Figure 13:
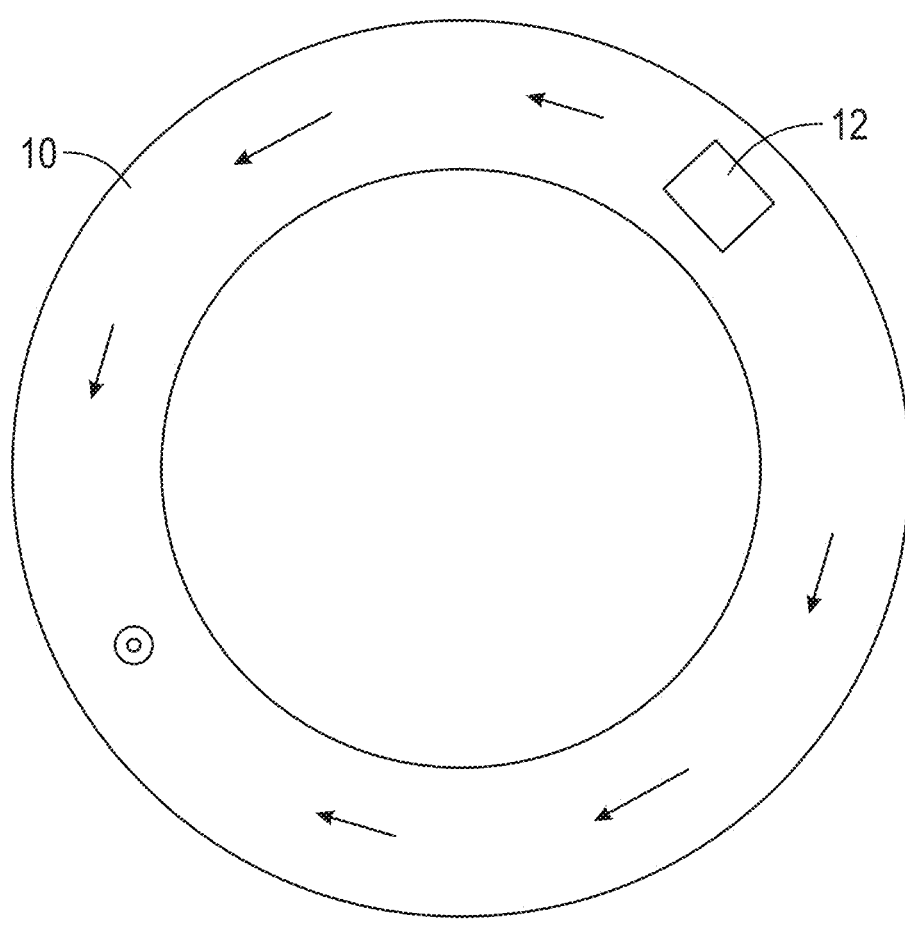
FIGS. 13 and 14 are schematic depictions of an off-axis Halbach-based magnetic position encoder.
Figure 14:
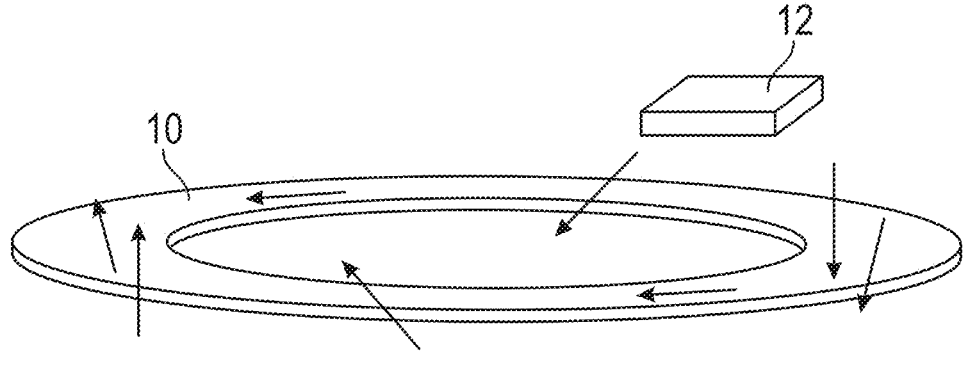

FIGS. 13-14 illustrate use of a Halbach element for off-axis position encoder applications. In the embodiments described above, the magnetic sensor 12 is aligned with the center of rotation of the shaft or other rotating element whose angle is being measured. In other instances, the sensor 12 may not be aligned with the center of rotation and is instead positioned at some radial distance away from the center of rotation; these instances are called "off-axis". In one example, for open frame motors where the sensor/magnet cannot be located on the axis of rotation an off-axis encoder configuration must be used. These rotary magnetic off axis approaches are sensitive to radial and axial bearing scale runouts. Additionally, as the scale's dipole spatial period gets smaller the position tolerance in the Z axis get smaller.

An off-axis Halbach configuration can have the following advantages:

a) A Halbach element magnet design allows the magnetic field to be either on the inside or on the outside of the magnetic array, easing radial alignment tolerances. Outside the Halbach element the sensor can be mounted either along the diameter or above the Halbach magnet, improving design flexibility. An example configuration is shown in FIGS. 13 and 14.

b) A multipole Halbach design by itself allows higher sine/cosine period resolution c) Superposition of a dipole component onto the multipole allows higher resolution without losing absolute position.

Figure 16:
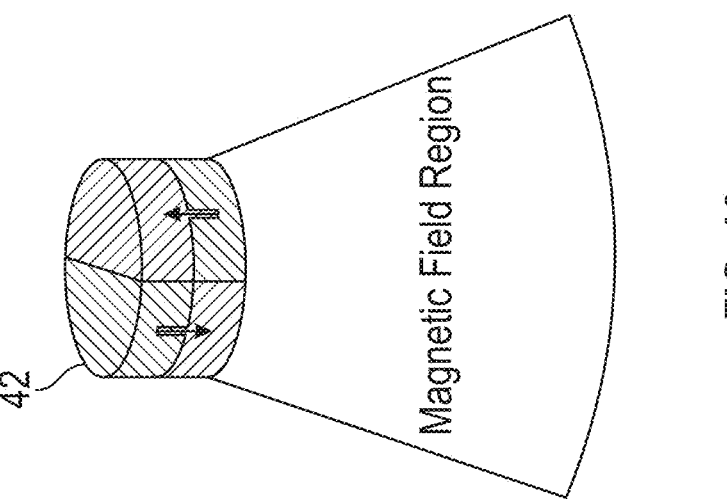
FIGS. 15 and 16 are depictions of split-magnet Halbach elements and their respective field regions.
Figure 15:
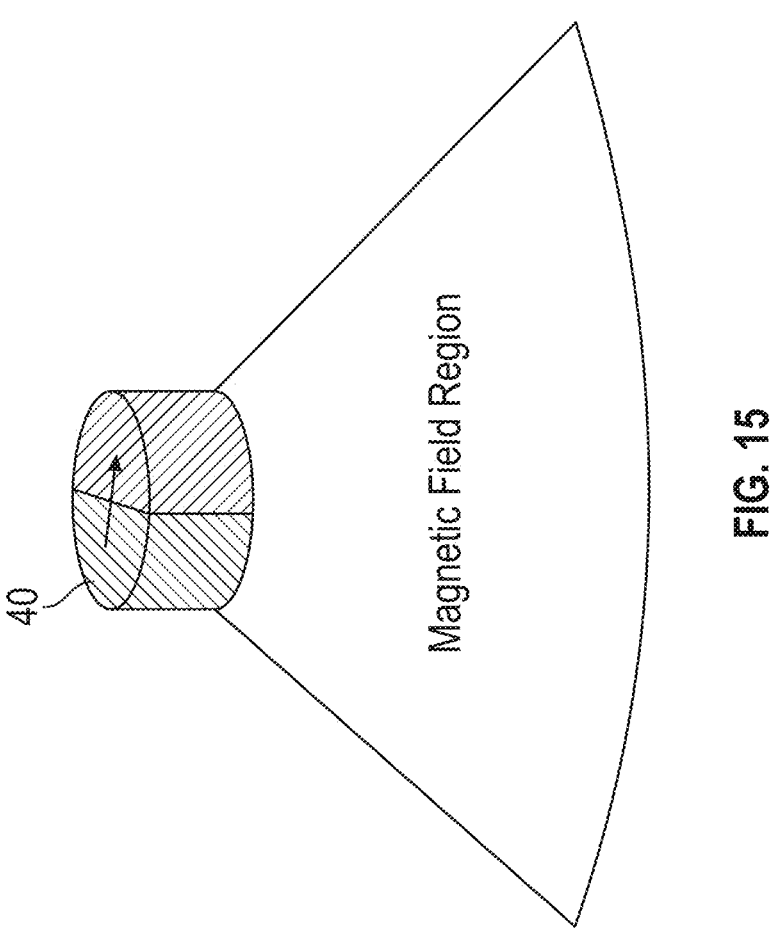
Figure 17:
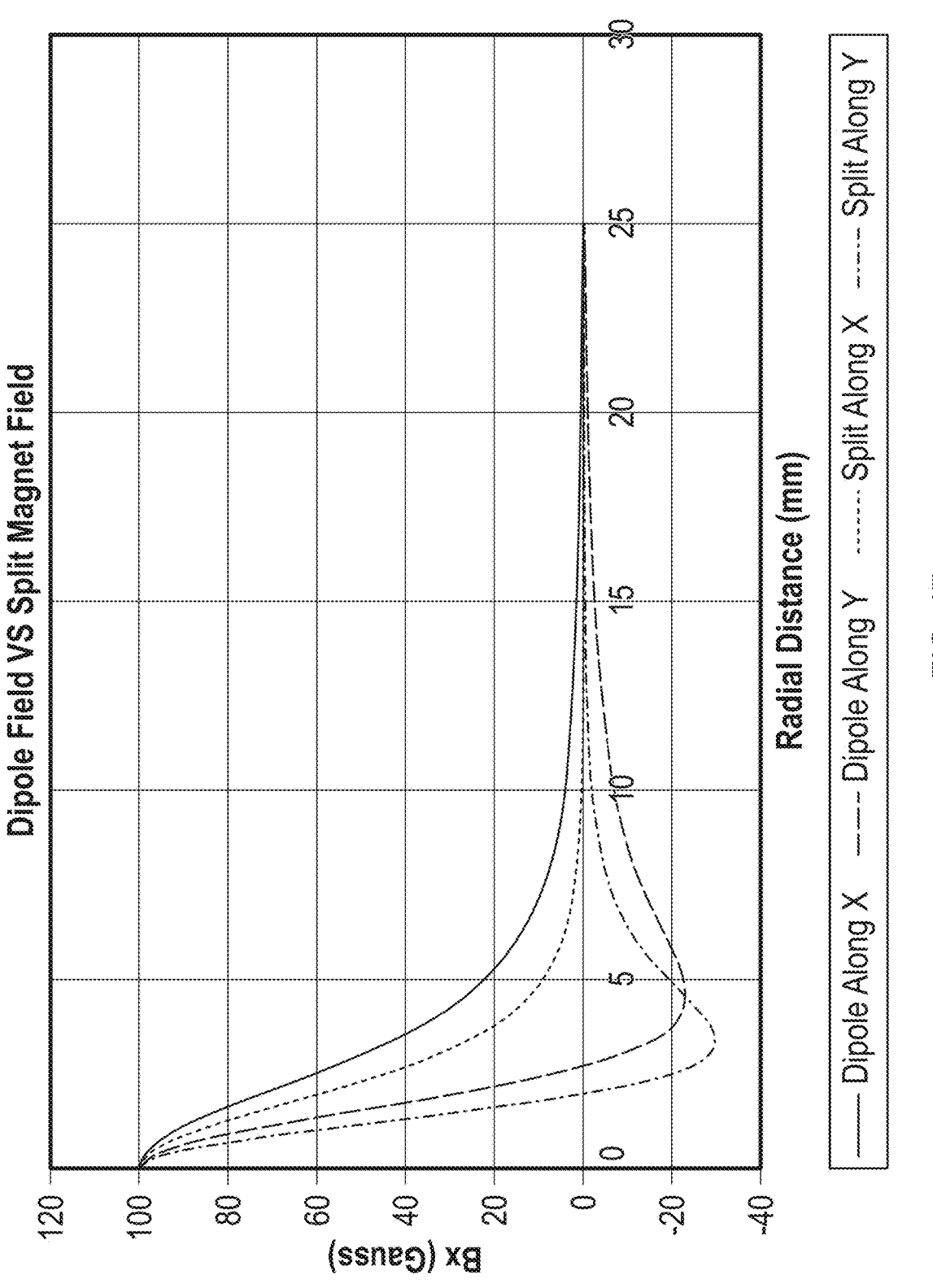
FIG. 17 is a plot of dipole field versus split-magnet field.

FIGS. 15-17 illustrate use of Halbach split-magnet, on-axis arrangements. FIG. 15 shows a two-magnet array 40, and FIG. 16 shows a four-magnet array 42. In applications in which the Halbach element cannot surround the sensor, a split magnet design can be used. This projects the dipole field beyond the magnet on one surface. Note that in these examples, while the dipole field extends beyond the normalized volume, the split magnet field is contained within that same volume. This demonstrates that multiple split configurations can be used closer together than possible with a dipole configuration.

FIG. 17 is a plot illustrating that the split magnet augments the magnetic field so that it falls off quickly in the x and y direction while providing the required field levels at a particular z height. This allows other magnet encoder axes to be packed closer together than for a dipole magnet.

Figure 18:
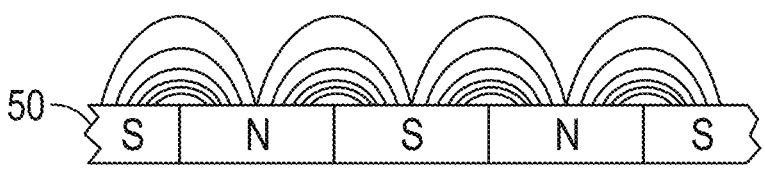
FIGS. 18-19 are schematic depictions of linear alternating-dipole magnetic elements.
Figure 19:
Figure 20:
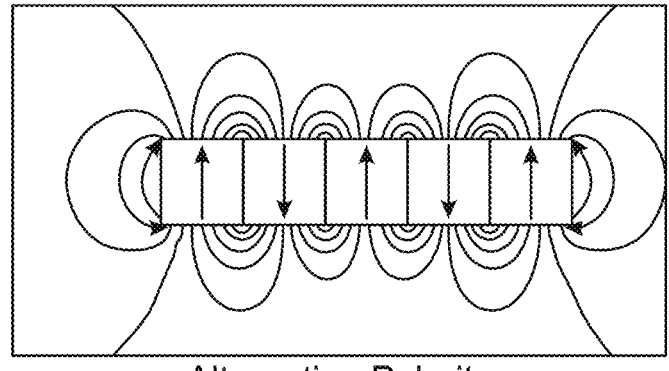
FIGS. 20-21 are depictions of magnetic field lines for an alternating-dipole element and linear Halbach element respectively.
Figure 21:
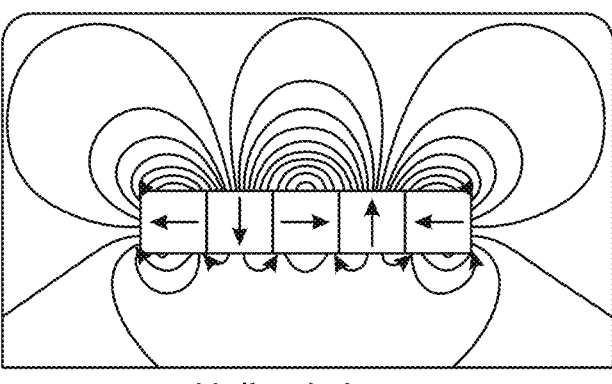

FIGS. 18-21 illustrate the use of linear Halbach arrays for linear magnetic "gratings" (i.e., elements that provide a magnetic analog of optical gratings, producing a spatially varying pattern of energy that can be sensed). FIGS. 18 and 19 show conventional linear magnetic gratings 50, 52 that consist of alternating dipole periods as shown. To increase the resolution of the system, for a similarly sized grating, more dipole periods can be squeezed in (FIG. 19). But this reduces the extent of the field region above the grating, resulting in the sensor having to move closer and closer to the grating. This makes the application of small dipole period grating extremely difficult to use. FIGS. 20-21 illustrate that use of a Halbach linear array can greatly increase the sensitivity region above the surface of the "grating" allowing smaller spatial periods and/or lower sensor alignment sensitivities. In contrast to the field pattern for a dipole grating as shown in FIG. 20, FIG. 21 shows that the pattern for a Halbach grating has much greater sensitivity on one side (upward in this Figure).

Additionally, a linear Halbach array reduces the field to zero below the "grating" sensing area, reducing interaction with any ferrous metal environment which can surround it. In fact, it may eliminate the need for a ferrous backing, which is typically used to enhance the dipole field in the measuring area and shield the backside area. Thus, the Halbach grating can avoid the cost and complexity associated with using a ferrous backing.

Figure 22:
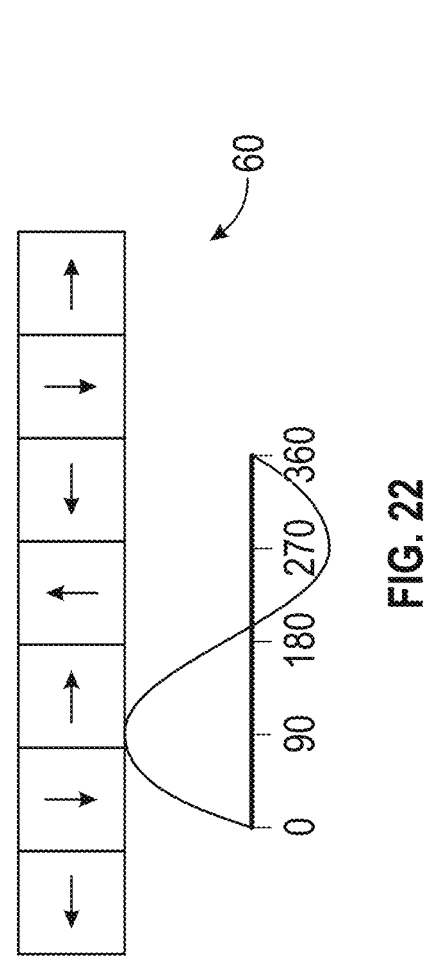
FIGS. 22-23 are schematic depictions of linear Halbach magnetic elements.
Figure 23:
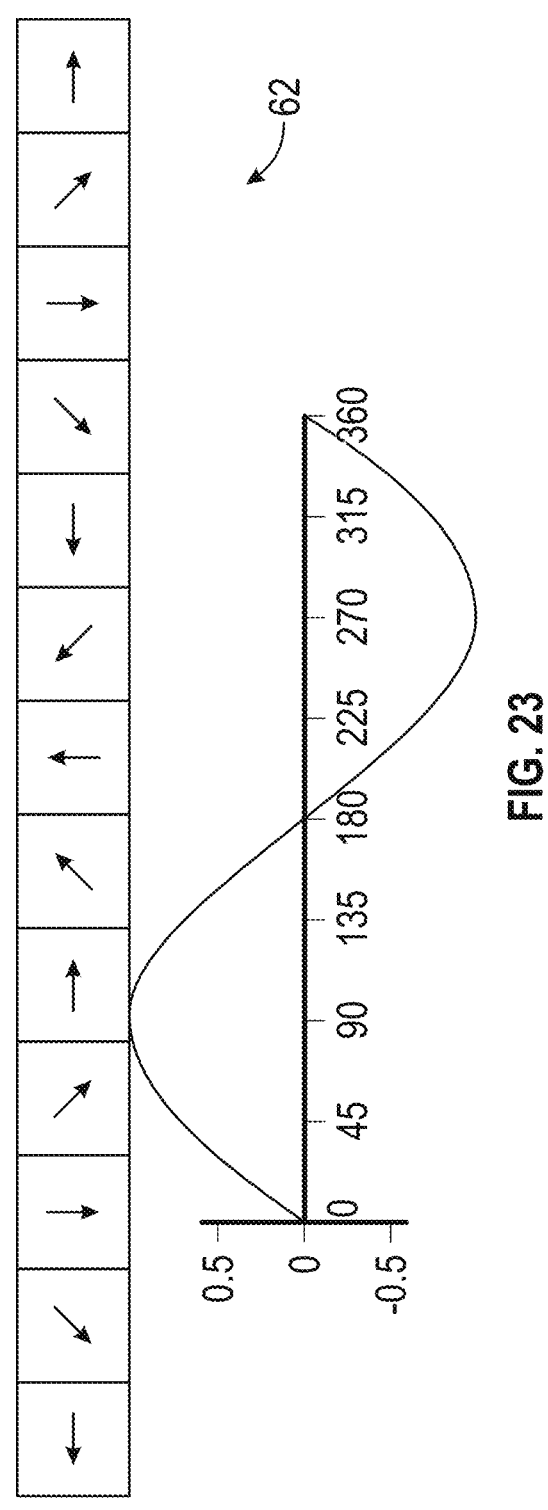

FIGS. 22-23 illustrate use of a Halbach array for an "absolute" linear grating. FIG. 22 shows a fairly coarse configuration 60 having only four dipoles over 360 degrees. But it is possible to "stretch" the dipole configuration over a long length of magnet material, which can then be used as an absolute-position track (having only one full pattern repeat over 360 degrees. FIG. 23 shows an example of a stretched configuration 62, having many more dipoles with finer-grained angle transitions and extending over a greater length. Such a "stretched" dipole arrangement can be used as a second track to track absolute position. It can also be superimposed on a much higher frequency Halbach track, with the phase relationship between the two tracks locked together, improving resolution while maintaining absolute position data.

The following summarizes certain features and advantages that may be realized in embodiments:

a) No external magnetic field, using a Halbach dipole b) Dipole superposition onto higher order configuration (sextupoles, octupoles, etc.)

c) Ferrous shield integrated into the magnet holder d) Long spatial period dipole for absolute linear grating e) Multiple configurations can use a common sensor f) Very high encoder packing density.

g) Little or no external magnetic field h) Working magnetic field is very homogenous for large alignment tolerance.

i) Robust operation in the presence of interfering magnetic fields or ferrous metal without customization for every application j) High resolution with low accuracy error k) Halbach configuration can accommodate different sensor orientations.

l) Because the magnet is a Halbach element it allows greater modulation of the magnetic sensor electrical output signal-all the produced field is in the sensitive direction of the sensor.

While various embodiments of the invention have been particularly shown and described, it will be understood by those skilled in the art that various changes in form and details may be made therein without departing from the scope of the invention as defined by the appended claims.

What is claimed is:

1. A Halbach-based magnetic position sensor, comprising:

a Halbach magnetic element having a spatially rotating magnetization pattern along an extent thereof, the magnetization pattern being effective to produce a focused and augmented magnetic field on a working side of the Halbach magnetic element relative to a magnetic field on a non-working side, the Halbach magnetic element having a continuously magnetized, closed curve configuration surrounding an inside area as the working side and defining an outside area as the non-working side; and a sensing element on the working side of the Halbach magnetic element and being co-configured with the Halbach magnetic element for relative motion therebetween, the sensing element including encoder circuitry and one or more magnetic sensors, the sensors being configured to sense the working-side magnetic field and produce corresponding one or more sensor signals, the encoder circuitry being configured to translate the sensor signals into one or more position signals indicating relative position between the sensing element and the Halbach magnetic element, the position sensor having an on-axis arrangement in which the sensing element and the Halbach magnetic element are aligned with a rotational axis of a rotating member whose rotational position is to be sensed.

2. The Halbach-based magnetic position sensor of claim 1, wherein the Halbach magnetic element has a multi-pole configuration to produce the working-side magnetic field having a multi-pole component with two or more cycles of variation over one cycle of relative rotation between the sensing element and the Halbach magnetic element.

3. The Halbach-based magnetic position sensor of claim 2, having a superposition of the multi-pole component with a dipole component, the dipole component providing an absolute position indicative of a first resolution, the multi-pole component providing an incremental position indication of a finer second resolution.

4. The Halbach-based magnetic position sensor of claim 1, further including a flux-carrying shield around the Halbach magnetic element to provide shielding from external magnetic fields.

5. The Halbach-based magnetic position sensor of claim 4, wherein the flux-carrying shield is of a ferrous material.

6. The Halbach-based magnetic position sensor of claim 4, wherein the Halbach magnetic element is of generally cylindrical shape, and the flux-carrying shield surrounds and is carried by the Halbach magnetic element and has an end portion extending axially beyond an end portion of the Halbach magnetic element.

7. The Halbach-based magnetic position sensor of claim 1, wherein the Halbach magnetic element is of generally cylindrical shape with a ratio of axial length to inner radius of 2 or more.

* * * * *